United States Patent
Moore

(10) Patent No.: US 9,643,310 B2
(45) Date of Patent: May 9, 2017

(54) AUTOMATIC LUBRICATION SYSTEM WITH DETUNE

(71) Applicant: Caterpillar Inc., Peoria, IL (US)

(72) Inventor: Cody Moore, Waco, TX (US)

(73) Assignee: Caterpillar Inc., Peoria, IL (US)

(*) Notice: Subject to any disclaimer, the term of this patent is extended or adjusted under 35 U.S.C. 154(b) by 322 days.

(21) Appl. No.: 14/457,764

(22) Filed: Aug. 12, 2014

(65) Prior Publication Data
US 2016/0046009 A1    Feb. 18, 2016

(51) Int. Cl.
| B25D 17/26 | (2006.01) |
|---|---|
| E02F 9/22 | (2006.01) |
| B25D 9/08 | (2006.01) |
| B25D 9/12 | (2006.01) |
| B25D 9/18 | (2006.01) |
| F16N 7/36 | (2006.01) |
| F16N 29/04 | (2006.01) |
| B25D 9/20 | (2006.01) |

(52) U.S. Cl.
CPC .............. *B25D 17/26* (2013.01); *B25D 9/08* (2013.01); *B25D 9/12* (2013.01); *B25D 9/18* (2013.01); *B25D 9/20* (2013.01); *E02F 9/2267* (2013.01); *F16N 7/36* (2013.01); *F16N 29/04* (2013.01); *B25D 2209/007* (2013.01); *B25D 2250/371* (2013.01); *F16N 2260/04* (2013.01)

(58) Field of Classification Search
CPC . B25D 17/26; B25D 9/08; B25D 9/12; B25D 9/18; B25D 9/20; B25D 2209/007; B25D 2250/371; E02F 9/2267; F16N 7/36; F16N 29/04; F16N 2260/04

USPC ........................................................ 184/6.14
See application file for complete search history.

(56) References Cited

U.S. PATENT DOCUMENTS

| 1,200,640 | A | | 10/1916 | Morris | |
|---|---|---|---|---|---|
| 1,874,025 | A | | 8/1932 | Clapp | |
| 2,600,348 | A | * | 6/1952 | Walthers | F15B 13/0435 137/625.6 |
| 3,487,892 | A | * | 1/1970 | Kiefer | F16N 13/04 184/27.1 |
| 5,060,761 | A | * | 10/1991 | Arndt | B25D 17/26 184/29 |
| 5,293,959 | A | * | 3/1994 | Kimberlin | B25D 17/265 173/71 |
| 5,823,295 | A | | 10/1998 | Griffith et al. | |
| 6,145,625 | A | * | 11/2000 | Prokop | F16N 13/02 184/105.2 |

(Continued)

FOREIGN PATENT DOCUMENTS

CN         101725814 B       3/2012

*Primary Examiner* — Michael Riegelman
(74) *Attorney, Agent, or Firm* — Leydig, Voit & Mayer, LTD.

(57) ABSTRACT

Lubrication system includes a drive fluid valve member and a detune valve member. The drive fluid valve member is movable from a first to a second position in response to drive fluid pressure to reduce the volume of a variable volume lubricant charge chamber. The detune valve member is movable from a first to a second position in response to lubricant pressure within the lubricant charge chamber, and is adapted to permit fluid communication between inlet and bypass fluid passages in its the first position and to disengage the fluid connection in its second position.

20 Claims, 10 Drawing Sheets

(56) References Cited

U.S. PATENT DOCUMENTS

| | | | |
|---|---|---|---|
| 6,938,873 B2 * | 9/2005 | Fischer | F01L 1/267 251/30.01 |
| 7,900,748 B2 | 3/2011 | Bukhari et al. | |
| 8,689,940 B2 | 4/2014 | Jagdale et al. | |
| 2006/0243528 A1 * | 11/2006 | Bukhari | F16N 7/36 184/27.1 |
| 2009/0277657 A1 | 11/2009 | Berger et al. | |
| 2010/0236652 A1 * | 9/2010 | Hattori | F15B 13/0403 137/625.42 |
| 2012/0043163 A1 * | 2/2012 | Jagdale | B25D 17/26 184/6.4 |
| 2015/0047928 A1 * | 2/2015 | Hiner | F15B 13/0403 184/6.14 |

* cited by examiner

AUTOMATIC LUBRICATION SYSTEM WITH DETUNE

TECHNICAL FIELD

This patent disclosure relates generally to a lubrication system for and method of lubricating a work tool powered by a drive fluid, and more particularly to a lubrication system for a hydraulic or pneumatic hammer.

BACKGROUND

Demolition hammers are used on work sites to break up objects such as rocks, concrete, asphalt, frozen ground, or other hard objects. The hammers may be mounted to machines, such as backhoes and excavators, or may be hand-held. The hammers may be powered by a hydraulic or pneumatic pressure source. In operation, a high pressure fluid drives a piston to strike a tool bit, which in turn, strikes rock, concrete, asphalt or other hard object to be broken up.

Lubrication systems are used to supply lubricant, such as grease, to bearing surfaces in the hammer to reduce friction between moving parts, such as between the tool bit and bushings that are used to align the tool bit. The lubrication system may be separate from the hammer, for example by being mounted on a carrier machine, or mounted to the hammer, i.e., an on-board system. Whether externally mounted or on-board, a lubricant supply is provided with the system. Operating the hammers without lubrication can result in significant damage to the hammer. In order to monitor the amount of lubricant remaining, many systems provide inspection windows, so that an operator can visually monitor the amount of lubricant remaining. Such systems, however, are dependent on the operator taking the necessary steps to manually check the window.

In the system of U.S. Pat. No. 8,689,940 B2 to Jagdale, et al., a lubrication system having moveable a valve member is configured to divert drive fluid to shutdown or derate the tool. The valve member is actuable in response to engagement by a projection on a plunger disposed within the lubricant reservoir. The plunger follows the lubricant within the lubricant reservoir and when the lubricant reaches a low level, the projection engages and actuates the valve member. When the valve member moves from a first to a second position, it opens a passageway to a drive fluid outlet which diverts drive fluid back to the drive fluid source.

SUMMARY

The disclosure described, in one aspect, a lubrication system for a tool powered by a drive fluid. The lubrication system includes a lubricant charge chamber having a variable volume, a drive fluid valve member and a detune valve member. The drive fluid valve member is movable from a first position to a second position in response to pressure of drive fluid to reduce the volume of the lubricant charge chamber. The detune valve member is movable operable between a first position and a second position in response to lubricant pressure within the lubricant charge chamber. The detune valve member is adapted to permit a fluid connection between an inlet fluid passage and a bypass fluid passage when the detune valve member is in the first position and to disengage said fluid connection between the inlet fluid passage and the bypass fluid passage when the detune valve member is in its second position.

The disclosure describes, in another aspect, a method of lubricating and detuning a tool. The method includes moving a drive fluid valve member from a first position to a second position in response to pressure of drive fluid associated with operation of the tool to reduce the volume of a lubricant charge chamber having a variable volume. The method further includes providing lubricant to the tool from the lubricant charge chamber when the drive fluid valve member moves from its first position to its second position. The method further includes moving a detune valve member between a first position and a second position in response to lubricant pressure within the lubricant charge chamber, providing a fluid connection between an inlet fluid passage and a bypass fluid passage when the detune valve member is in the first position, disengaging said fluid connection between the inlet fluid passage and the bypass fluid passage when the detune valve member is in its second position.

BRIEF DESCRIPTION OF THE DRAWING(S)

DETAILED DESCRIPTION

Figure 1:
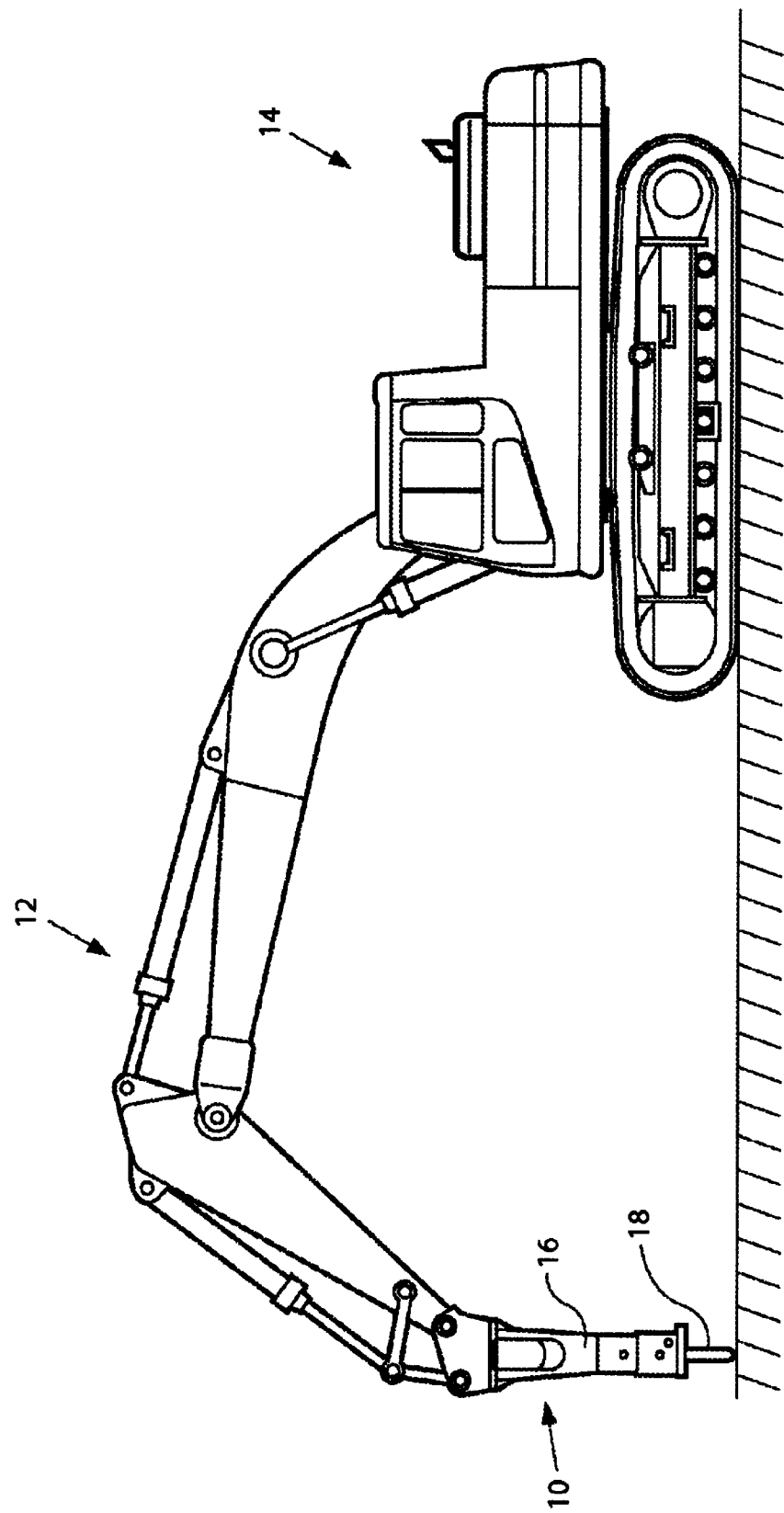
FIG. 1 is a schematic view of an embodiment of a tool attached to an excavator.

Referring to FIG. 1, a work tool 10 powered by a drive fluid is attached to a boom 12 of an excavator 14. The work tool 10, however, may be connected to any suitable machine or base. In the depicted embodiment, the work tool 10 is a hydraulic or pneumatic powered breaking tool, such as a demolition hammer. When attached to the excavator 14, as illustrated, the excavator's hydraulic system may be used to power the tool. Thus, the drive fluid may be hydraulic fluid. The present disclosure, however, is applicable to other hydraulic or pneumatic tools and to tools powered by other means. The work tool 10 includes a power cell 16 and a tool 18. The power cell 16 is configured to provide a breaking force via the tool 18 to an object, such as rocks, concrete, asphalt, frozen ground, or other hard objects.

While the arrangement is illustrated in connection with an excavator 14, the arrangement disclosed herein has universal applicability in various other types of machines as well. The term "machine" may refer to any machine that performs some type of operation associated with an industry such as mining, construction, farming, transportation, or any other industry known in the art. For example, the machine may be an alternate earth-moving machine, such as a wheel loader, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

Figure 2:
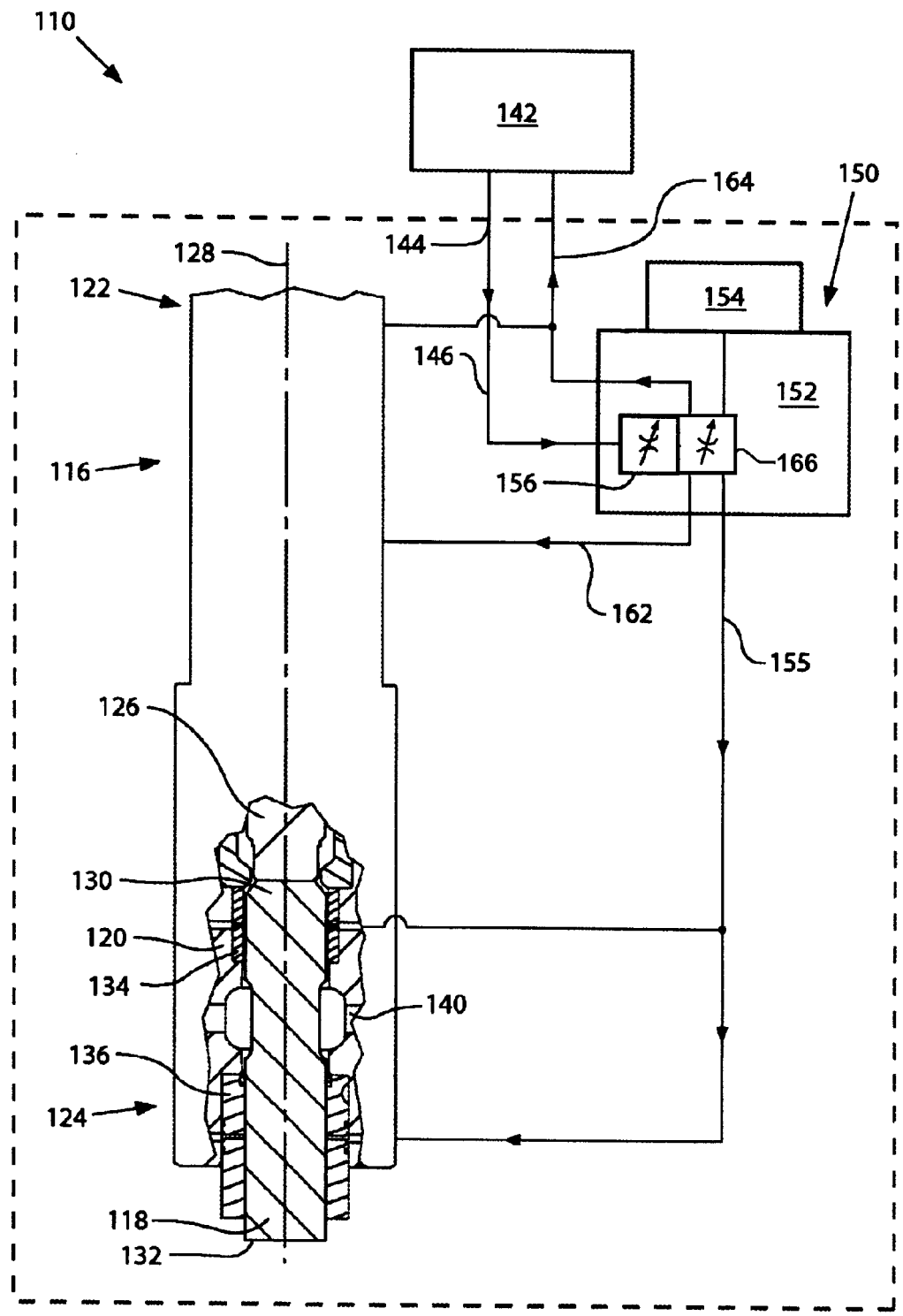
FIG. 2 is a schematic and cross-sectional view of an embodiment of the tool provided with a lubricating system according to the present disclosure.
Figure 3:
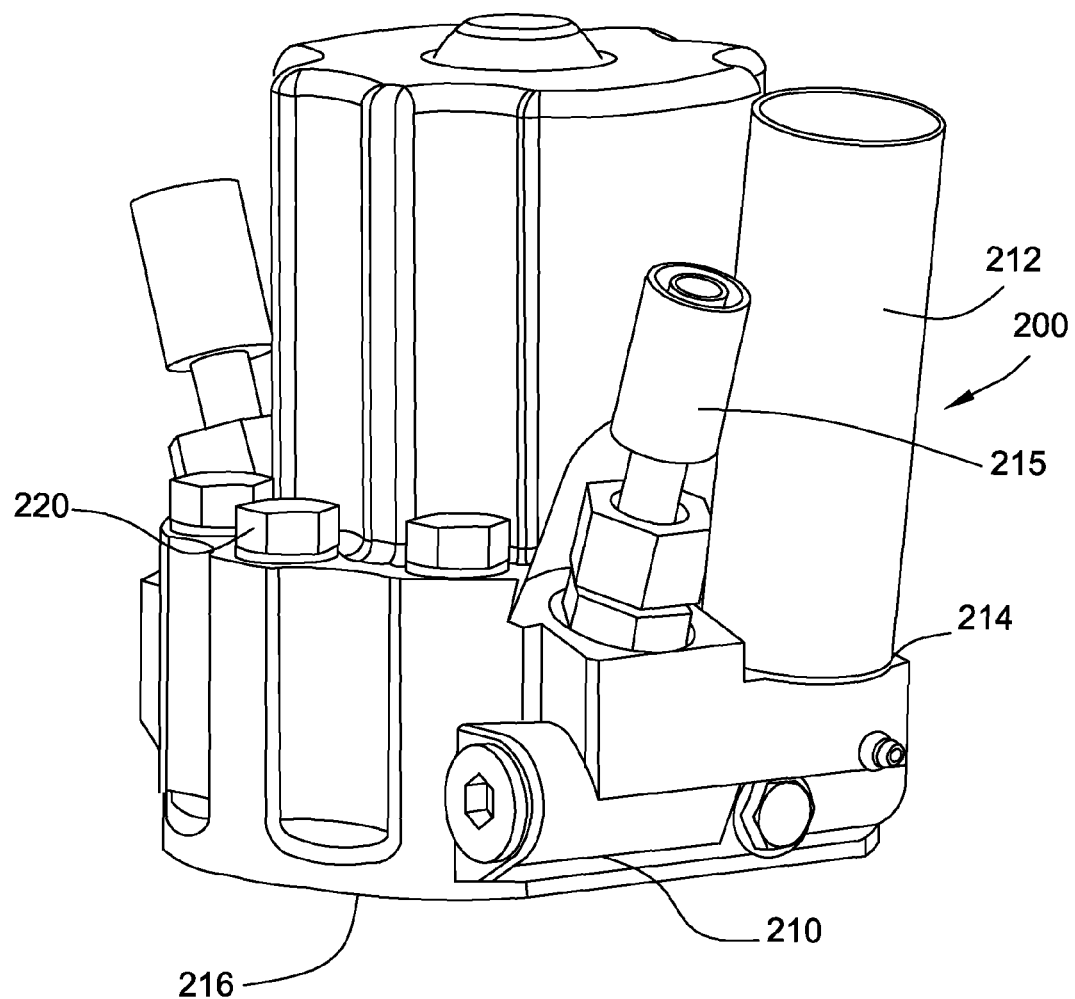
FIG. 3 is an isometric view of an embodiment of the lubricating system according to the present disclosure.

FIG. 2 is a schematic illustration of an embodiment of a work tool 110 powered by a drive fluid according the present disclosure. The work tool is illustrated as a demolition hammer 110, such as a hydraulic hammer. The hammer 110 includes a power cell 116 and a tool 118. The power cell 116 includes a housing 120 having an upper end 122 and a lower end 124. The housing 120 may be formed as a single piece or may consist of a plurality of pieces and may be configured in a variety of ways. A piston 126 is disposed within the housing 120 and is movably along an axis 128. The tool 118 is also disposed within the housing 120 and is movably along the axis 128. The tool 118 includes a first end 130 and a second end 132. The first end 130 is configured and positioned in the housing to be struck by the piston 126. The second end 132 of the tool 118 extends from the lower end 124 of the housing 120 to be engaged with objects to be broken.

The power cell 116 may also include an upper bushing 134 and a lower bushing 136. The upper bushing 134 and the lower bushing 136 are fixably held within the housing 120 by cross pins or other suitable means. The tool 118 is slidably received with the upper bushing 134 and the lower bushing 136. The tool 118 is retained within the housing 120 by retaining pins 140 or other suitable retention devices.

A drive fluid source 142 may be associated with the hammer 110. The drive fluid source 142 may be configured to, on demand, deliver pressurized drive fluid to the hammer for use in driving the piston 126. A pressure source, such as a fluid pump (not shown) or other suitable pressure source may be associated with the drive fluid source 142 to pressurize the drive fluid. The drive fluid source 142 may be in fluid communication with a fluid inlet 144 via a drive fluid inlet passage 146.

A lubrication system 150 is associated with the hammer 110. In FIG. 2, the lubrication system 150 is depicted within a dashed box that includes the power cell 116, thus indicating that the lubrication system 150 and the power cell 116 are formed integrally as a unit. For example, U.S. Pat. No. 7,900,748 discloses an embodiment of a lubrication system for a hydraulic or pneumatic tool in which the lubrication system is integral with the tool and no external hoses or other components are required. The lubrication system 150, however, may alternatively be externally mounted, for example by being mounted on a carrier machine or may be an on-board system that is mounted on the hammer and in fluid communication with the hammer via hoses or other conduits.

The lubrication system 150 includes a housing 152 in fluid communication with a lubricant reservoir 154. Any suitable lubricant may be used, such as grease for example. The lubrication system 150 is in fluid communication with the power cell 116 via a lubricant passage 155. The lubricant passage 155 communicates lubricant to each of the upper bushing 134 and the lower bushing 136. For ease of illustration, a portion of lubricant passage 155 is illustrated external to housing 120, though in some embodiments, the lubricant passage 155 may consist of internally formed conduits in the housing 152.

The lubrication system 150 includes a movable drive fluid valve member 156 and a movable detune valve member 166. The movable drive fluid valve member 156 may be configured in a variety of ways, and may include any member configured to move from a first position to a second position in response to drive fluid pressure. The movable detune valve member 166 may likewise be configured in a variety of ways, and may include any member configured to move from a first position to a second position in response to drive fluid pressure and lubricant pressure.

When the detune valve member 166 is in its second position and the drive fluid valve member 156 is in its second position, drive fluid flowing through the drive fluid inlet passage 146 may be directed to the hammer 110 via a drive fluid hammer passage 162 in order to act upon the piston 126. When the drive fluid valve member 156 is in its second position and the detune valve member 166 is in its first position, however, all or a portion of the drive fluid flowing through the drive fluid inlet passage 146 may be diverted away from acting on the piston 126. For example, in the second position, all or a portion of the fluid flowing through the drive fluid inlet passage 146 maybe diverted back to the drive fluid source 142 via a drive fluid bypass passage 164. In this manner, when a low amount of lubricant within the lubricant reservoir 154 is indicated, the hammer 110 is disabled, derated or detuned (a reduced or limited amount of pressurized fluid being delivered to the piston).

Movement of the drive fluid valve member 156 from its first position to its second position additionally passes a volume of lubricant through the lubrication system 150 to the lubricant passage 155. According to an aspect of this disclosure, operation of the detune feature is provided by both drive fluid pressure and lubricant pressure. In the embodiment illustrated, the movement of the drive fluid valve member 156 from its first to its second position is dependent upon the application of drive fluid pressure. The movement of the detune valve member 166 from its first to its second position is dependent not only upon lubricant pressure, but also upon drive fluid pressure, that is, the movement of the drive fluid valve member 156 as a result of drive fluid pressure.

FIGS. 3-7 illustrate an embodiment of a lubrication system 200 for a work tool powered by a drive fluid of the present disclosure. The lubrication system 200 includes a housing 210 and a lubricant reservoir 212, such as a grease cartridge. The lubricant reservoir 212 in the depicted embodiment is a grease cartridge, though other suitable lubricants can be used. In addition, other embodiments may have more than one reservoir. The housing 210 receives the lubricant reservoir 212 in a recess 214 in an upwardly facing surface of the housing 210. The recess 214 includes seats for various seals (not shown), which prevent lubricant from the reservoir 212 from leaking out of the top of the recess 214. Drive fluid pressure is provided to the housing 210 through hose fitting 215.

The housing 210 is configured to mount to a body portion of the hammer to form an on-board or integrated lubricant system with the hammer. In other embodiments, the lubricant system can be separate from the hammer, for example by being mounted on a carrier machine. The lower portion of the housing 210 includes a face portion 216 having a plurality of apertures for receiving fasteners 220, such as bolts, to attach the housing 210 to the body portion.

Figure 4:
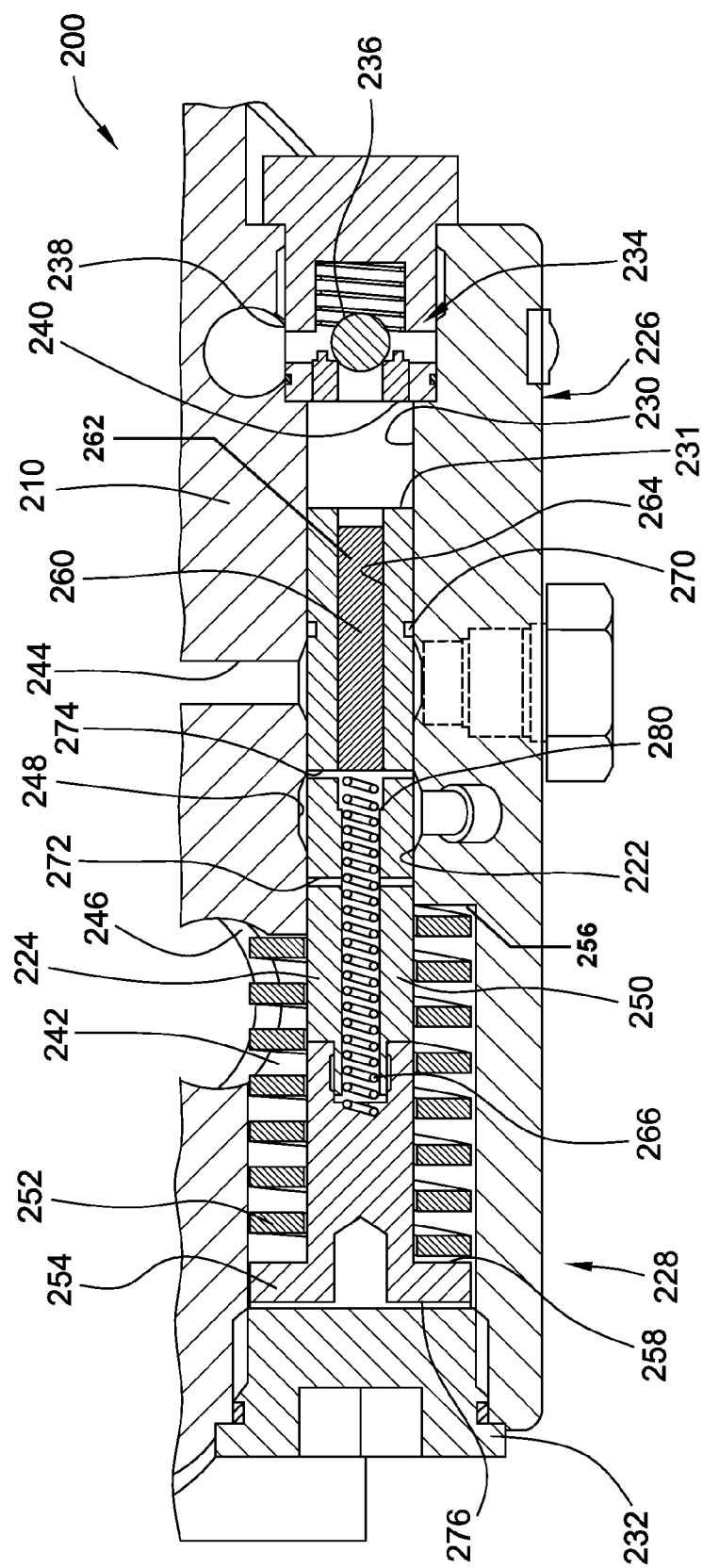
FIGS. 4-10 are partial cross-sectional views of the lubricating system of FIG. 3 in various stages of operation.

The lubrication system 200 may be understood further with reference to the cross-sectional view illustrated in FIG. 4. The housing 210 includes a valve channel 222 in which a drive fluid valve member 224 is movably disposed. The valve channel 222 includes a lubrication end 226 and a drive fluid end 228. The lubrication end 226 includes a lubricant charge chamber 230, which is generally defined by an end 231 of the drive fluid valve member 224 within the valve channel 222. The lubricant charge chamber 230 may vary in volume depending upon the location of the drive fluid valve member 224 within the valve channel 222.

In the depicted embodiment, the drive fluid end 228 of the valve channel 222 is closed by a plug 232, while the lubrication end 226 of the valve channel 222 includes a lubricant valve assembly 234. While the lubricant valve assembly 234 may be of any appropriate design, the illustrated lubricant valve assembly 234 includes a check valve 236 the selectively provides a fluid connection between the lubricant charge chamber 230 and a lubricant outlet 238 to a lubricant passage, such as lubricant passage 155 of FIG. 2, to a power cell in conjunction with a tool. In order to provide lubricant to the lubricant charge chamber 230, a lubricant inlet (shown generally as 240) is fluidly connected with a lubricant reservoir, such as the lubricant reservoir 212. It will be appreciated that the lubricant inlet 240 is at the base of the lubricant reservoir 212 illustrated in FIG. 3, that is, lubricant enters the lubricant charge chamber 230 from above in the cross-section of FIGS. 4-10. In this way, lubricant drawn into the lubricant charge chamber 230 may be passed through the check valve 236 and on to the tool.

Drive fluid pressure is provided to the valve channel 222 by way of at least one drive fluid inlet (indicated generally as 242, 244). The drive fluid inlet 242 is at the base of the hose fitting 215 illustrated in FIG. 3. Accordingly, as with the lubricant inlet 240, the drive fluid enters the valve channel 222 from above in the cross-section of FIGS. 4-10. The housing 210 further includes at least one drive fluid hammer passage 246 and at least one drive fluid bypass passage 248. In this embodiment, first and second drive fluid inlets 242, 244 are provided. Passage of drive fluid from the at least one drive fluid inlet 242, 244 through the valve channel 222 to either the at least on drive fluid hammer passage 246, or the at least one drive fluid bypass passage 248 is dependent upon the position of the drive fluid valve member 224 within the valve channel 222.

The drive fluid valve member 224 is biased to its first position illustrated, for example, in FIG. 4. The drive fluid valve member 224 includes an elongated spool 250, a biasing member 252, here, a spring, and a spring follower 254. The biasing member 252 is disposed between an engagement surface 256 within the valve channel 222 and an engagement surface 258 of the spring follower 254 to bias the spring follower 254 and the elongated spool 250 coupled to the spring follower 254 to the left as illustrated.

The lubrication system 200 additionally includes a movable detune valve member 260. In the illustrated embodiment, the detune valve member 260 includes a detune pin 262 that is movably disposed in an elongated detune channel 264 within the spool 250 of the drive fluid valve member 224. The detune valve member 260 is urged to its first position, illustrated in FIG. 4, by detune biasing member 266. In the illustrated embodiment, the detune biasing member 266 is a spring. When a force is exerted on the detune valve member 260, it may be moved to a second position against the force of the detune biasing member 266.

Movement of both drive fluid and lubricant through the lubrication system 200 is provided by way of movement of the drive fluid valve member 224 and of the detune valve member 260. In order to separate drive fluid from lubricant disposed between the drive fluid valve member 224 and the valve channel 222, at least one circumferential seal 270 is provided about the drive fluid valve member 224.

There is further provided at least one passage 272, 274 to selectively connect the at least one drive fluid inlet 242, 244 to the at least one drive fluid hammer passage 246 and the at least one drive fluid bypass passage 248. In the illustrated embodiment, first and second passages 272, 274 are provided through the movable drive fluid valve member 224. Additional passage is provided selectively by way of a portion of the detune channel 264. With the detune valve member 260 disposed in its first position, illustrated in FIG. 4, the first and second passages 272, 274 are fluidly connected by way of the detune channel 264. When the detune valve member 260 acts against the biasing force of the detune biasing member 266 to its second position, however, the detune valve member 260 seats against abutment surface 280, closing off the second passage 274 from the detune channel 264, and, therefore, the first passage 272. Thus, drive fluid may be permitted to selectively flow through the drive fluid valve member 224 based upon the position of the drive fluid valve member 224 relative to the at least one drive fluid inlet 242, 244, the at least one drive fluid hammer passage 246, and the at least one drive fluid bypass passage 248, as well as the position of the detune valve member 260 relative to the drive fluid valve member 224.

While the movement of the drive fluid between the at least one drive fluid inlet 242, 244, the at least one drive fluid hammer passage 246, and the at least one drive fluid bypass passage 248, has been described based upon the detune channel 264 and first and second passages 272, 274 through the drive fluid valve member 224, as well as the positions of the detune valve member 260 and the drive fluid valve member 224, it will be appreciated that the passages could be alternately provided, so long as operation of the detune feature of the lubrication system 200 is based, at least in part, upon pressure provided by the drive fluid itself. As will be explained in greater detail below, the direction of both drive fluid and lubricant through the lubrication system 200 is provided by movement of the drive fluid valve member 224 and the detune valve member 260, which movement is provided by pressures established by the drive fluid and the lubricant themselves.

INDUSTRIAL APPLICABILITY

Before the hammer is activated, the drive fluid valve member 224 is in the first position shown in FIG. 4, with the biasing member 252 urging the drive fluid valve member 224 to the left as illustrated. When the hammer is activated, pressurized drive fluid is supplied to the valve channel 222 by way of first and second drive fluid inlets 242, 244. Inasmuch as the seal 270 inhibits movement of the drive fluid into the lubricant charge chamber 230, the drive fluid moves around the movable drive fluid valve member 224, including the spring follower 254, which is not sealed against the valve channel 222. The upper surface 276 of the spring follower 254 being larger than the engagement surface 256, the drive fluid pressure causes the drive fluid valve member 224 to move to the right from the position illustrated in FIG. 4, to the positions illustrated in FIGS. 5 through 8.

Figure 5:
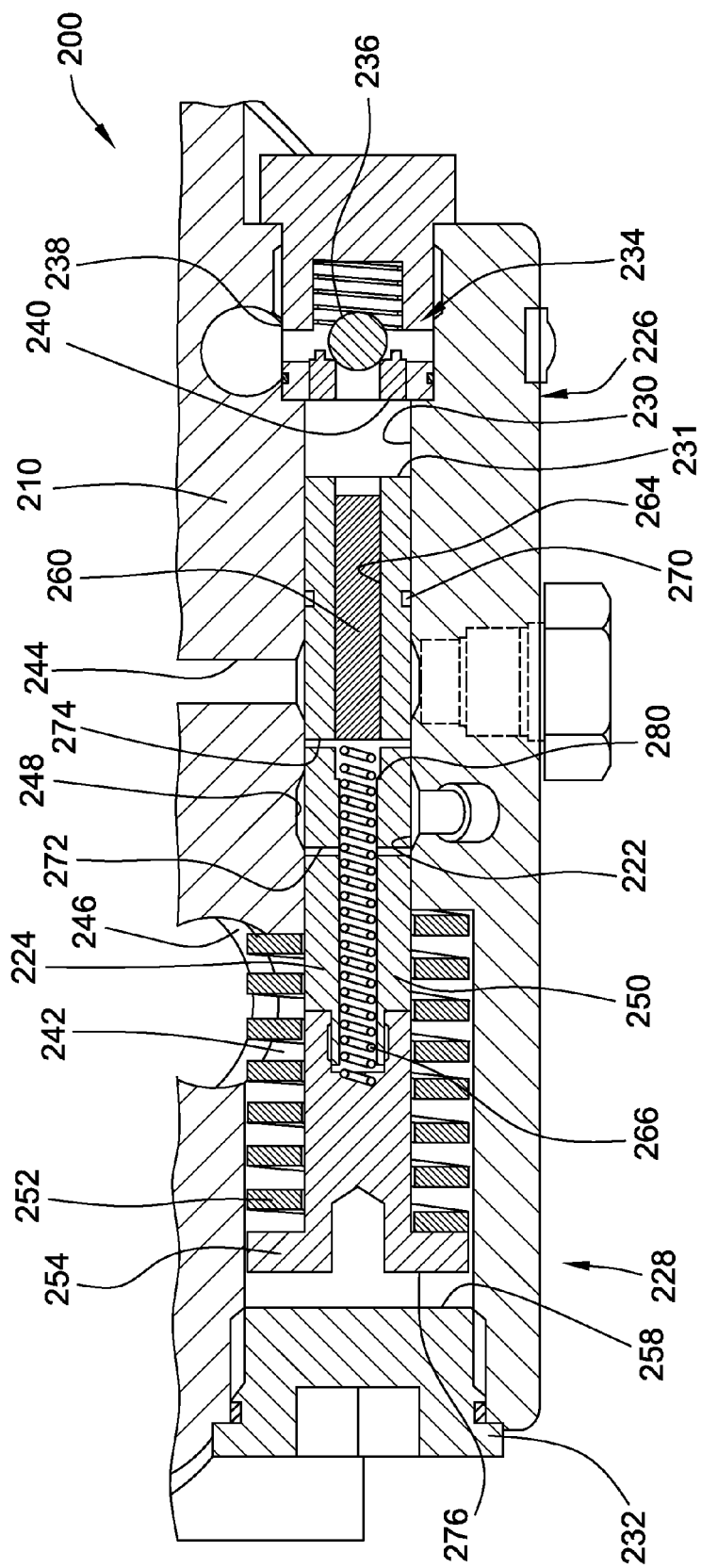
Figure 6:
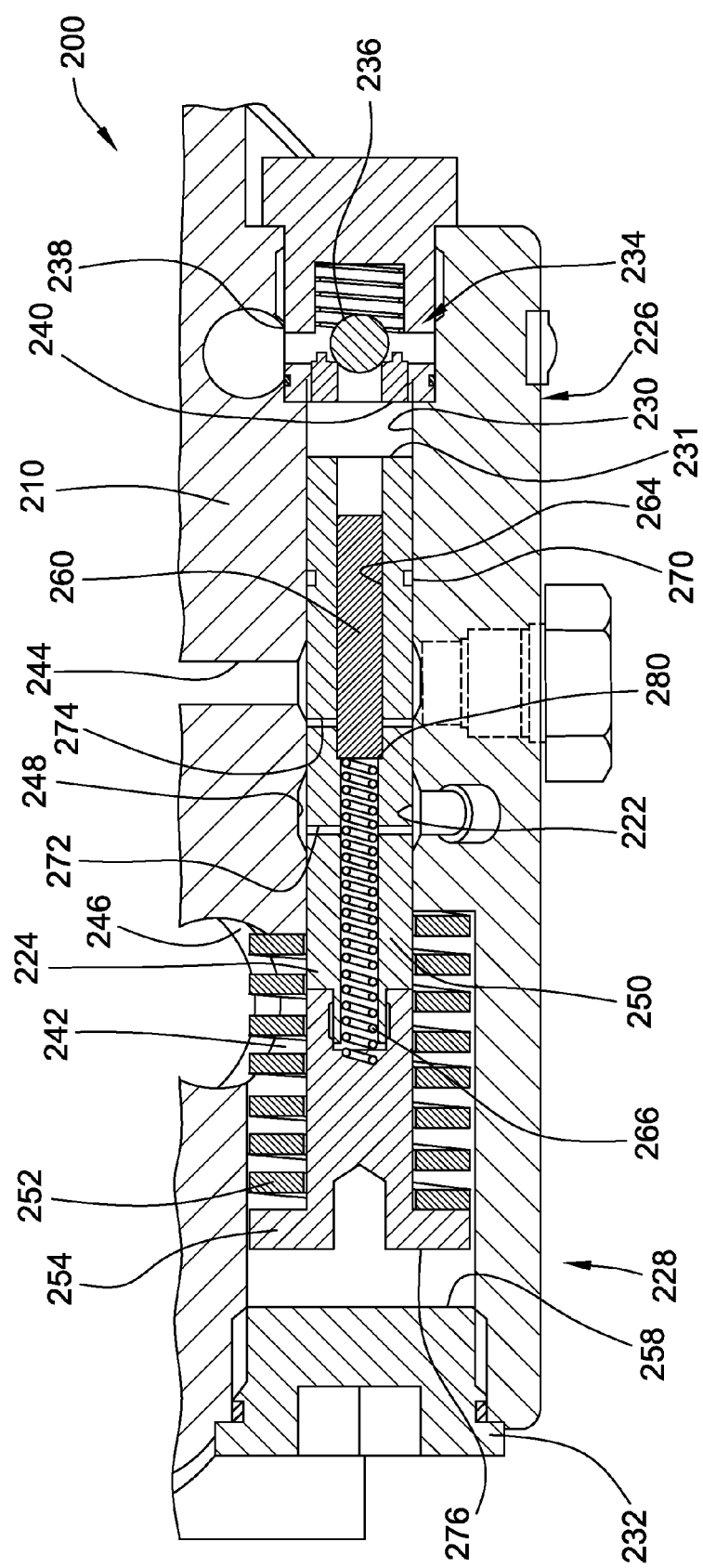

As the drive fluid valve member 224 moves to the right under the force of the drive fluid pressure, the lubricant charge chamber 230 within the valve channel 222 is also shortened as illustrated in FIG. 5, causing pressure from the lubricant contained within the lubricant charge chamber 230 to increase. As a result, pressure from the lubricant causes the detune valve member 260 to move against the force of the detune biasing member 266, moving the detune valve member 260 from its first position illustrated in FIGS. 4 and 5 to its second position, illustrated in FIG. 6.

Figure 7:
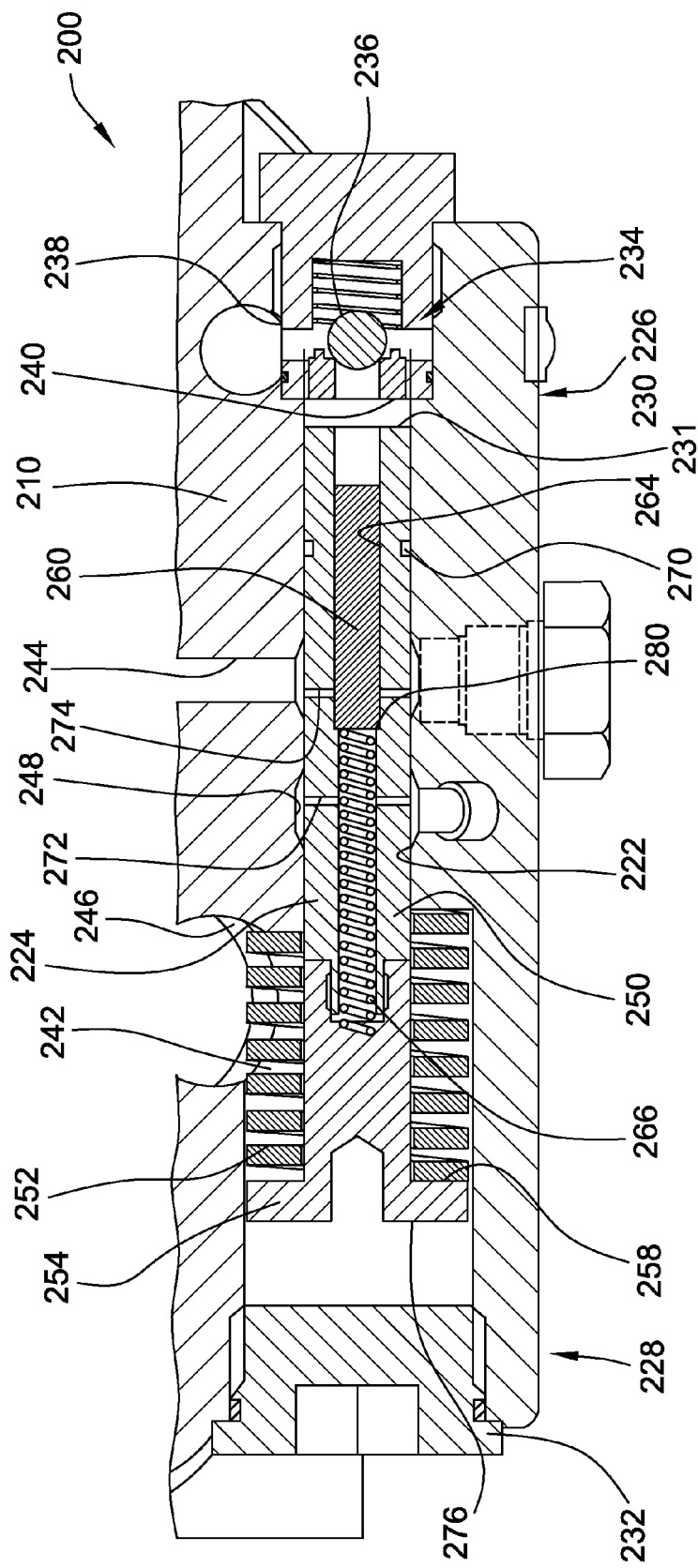
Figure 8:
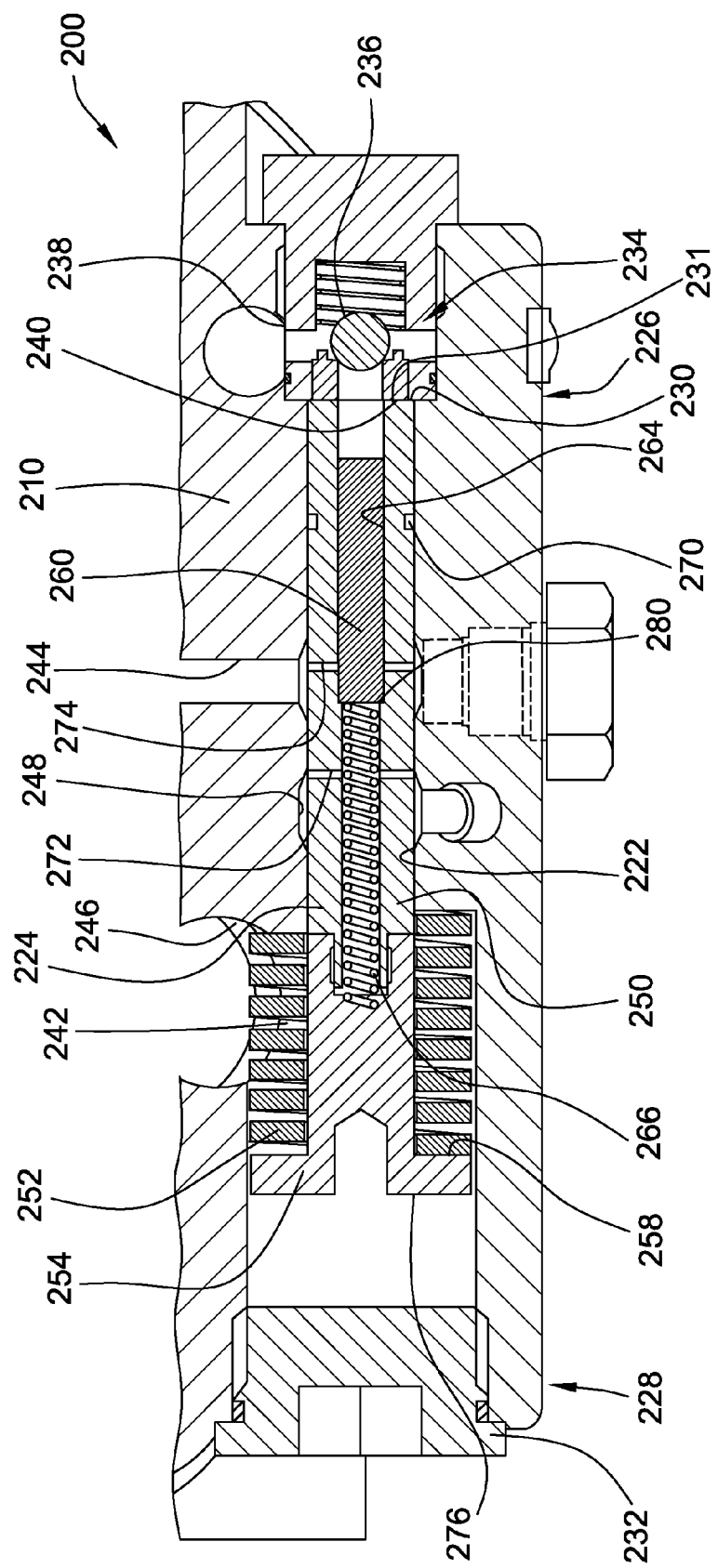

As the drive fluid valve member 224 moves from its first position in FIG. 4 toward its second position, as illustrated in FIGS. 5-8, the volume in lubricant charge chamber 230 decreases. When the volume decreases, some of the lubricant in the lubricant charge chamber 230 is forced through the check valve 236 and on to the lubricant outlet 238, as illustrated in FIGS. 7 and 8. FIG. 8 illustrates the drive fluid valve member 224 in its second position.

Referring now to the flow of drive fluid, as the drive fluid valve member 224 and the detune valve member 260 move from their respective first position illustrated in FIG. 4 toward their respective second positions illustrated in FIG.

8, and the detune valve member 260 closes off flow through the second passage 274 through the drive fluid valve member 224. As a result, flow from the first drive fluid inlet 242 is directed to the at least one drive fluid hammer passage 246 by way of the first and second passages 272, 274 and the detune channel 264.

After the hammer is deactivated, drive fluid pressure from the at least one drive fluid inlet 242, 244 decays. When the drive fluid pressure has decayed sufficiently, the biasing member 252 returns the drive fluid valve member 224 to its first position illustrated in FIG. 4. As the drive fluid valve member 224 returns to its first position, the volume of the lubricant charge chamber 230 is increased, the pressure within the lubricant charge chamber 230 decreases, producing a suction force that draws lubricant into the lubricant charge chamber 230 from the lubricant inlet 240, and allowing the force of the detune pin 262 to return the detune pin 262 to its first position, likewise illustrated in FIG. 4. Thus, the movement of the drive fluid valve member 224 and changing volume of the lubricant charge chamber 230 acts as a lubricant pumping mechanism.

Figure 9:
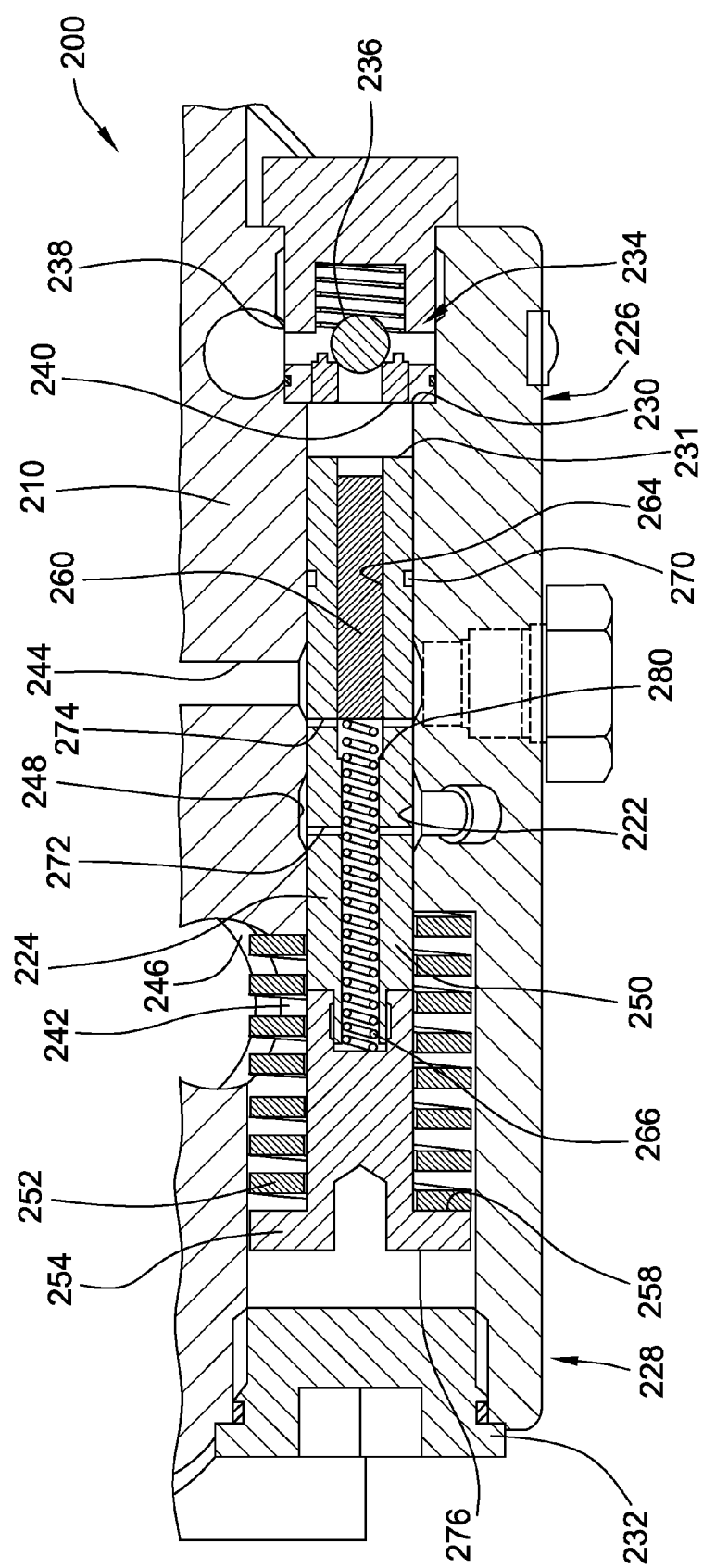
Figure 10:
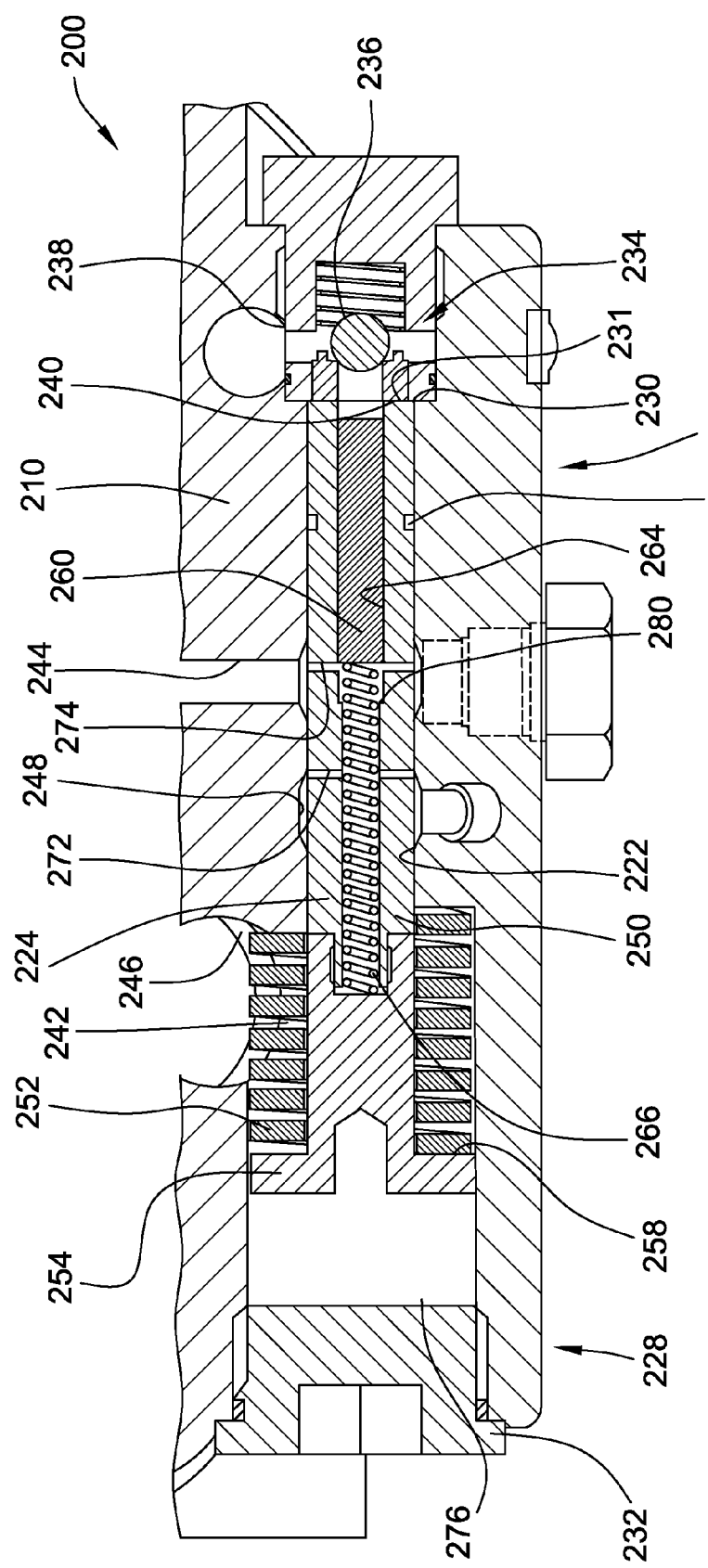

The cycle of FIGS. 4-8 continues as long as there is sufficient pressure from the lubricant within the lubricant charge chamber 230 to push the detune valve member 260 against the force of the detune biasing member 266, that is, to move the detune valve member 260 from its first position to its second position, closing off the second passage 274 through the drive fluid valve member 224. When the lubricant reservoir 212 empties, however, there is no longer sufficient pressure within the lubricant charge chamber 230 to move the detune valve member 260. Consequently, as the drive fluid valve member 224 moves toward its second position, the detune valve member 260 does not move to its second position, as illustrated in FIGS. 9 and 10, and the detune valve member 260 does not close the second passage 274. As a result, drive fluid from the second drive fluid inlet 244 may enter the second passage 274 and flow through the detune channel 264 and the first passage 272 to the at least one drive fluid bypass passage 248. This diversion of drive fluid will shut down or derate the tool. In other words, at least a portion of the drive fluid that would otherwise be flowing to the tool to operate the tool is diverted to the at least one drive fluid bypass passage 248, from which it is directed back to the drive fluid source to "detune" the tool. Thus, the lubrication system 200 has an automatic derate or shutoff feature to the tool when the level of lubricant is too low or the lubricant reservoir is empty.

Some embodiments of the lubrication system may utilize components that may be economically manufactured.

While the disclosed embodiments have been illustrated and described in detail in the drawings and foregoing description, such illustration and description is to be considered as exemplary and not restrictive in character, it being understood that only certain exemplary embodiments have been shown and described and that all changes and modifications that come within the scope of the disclosure are desired to be protected. For example, in alternative embodiments, the bearing surfaces of the hammer may be lubricated upon deactivation of the hammer, instead of upon activation. In such embodiments, the lubricant charge chamber may be replenished whilst the hammer is being activated, instead of upon deactivation.

The disclosed embodiments are not limited to use with demolition hammers. Rather, they may be used with any work tool powered by a drive fluid where lubrication of surfaces of the work tool is desired. In addition, other configurations of the valve assembly are possible.

It will be apparent to those skilled in the art that various modifications and variations can be made to the disclosed dosing system. Other embodiments will be apparent to those skilled in the art from consideration of the specification and practice of the disclosed method and apparatus. It is intended that the specification and examples be considered as exemplary only, with a true scope being indicated by the following claims and their equivalents.

I claim:

1. A lubrication system for a tool powered by a drive fluid, the lubrication system comprising:
    a housing defining an internal bore therein, the internal bore at least partly defining a valve channel and a lubricant charge chamber having a variable volume,
    a drive fluid valve member disposed within the valve channel and movable relative to the housing from a first drive position to a second drive position in response to a pressure of the drive fluid to reduce the variable volume of the lubricant charge chamber,
    a detune valve member movable relative to the drive fluid valve member between a first detune position and a second detune position in response to a lubricant pressure within the lubricant charge chamber,
    a seal disposed within the internal bore that blocks fluid communication between the lubricant charge chamber and the valve channel independent of a position of the drive fluid valve member and independent of a position of the detune valve member,
    the detune valve member being configured to
        effect fluid communication between a drive fluid inlet passage and a drive fluid bypass passage when the detune valve member is in the first detune position, and
        block fluid communication between the drive fluid inlet passage and the drive fluid bypass passage when the detune valve member is in its second detune position.

2. The lubrication system of claim 1 wherein the drive fluid valve member defines a detune channel therein, and the detune valve member is disposed within the detune channel.

3. The lubrication system of claim 1 wherein a first end of the drive fluid valve member is in fluid communication with the valve channel, a second end of the drive fluid valve member is in fluid communication with the lubricant charge chamber, and the seal is disposed on the drive fluid valve member between the first end of the drive fluid valve member and the second end of the drive fluid valve member, and
    the lubricant charge chamber is further defined by the second end of the drive fluid valve member.

4. The lubrication system of claim 1 further comprising a lubricant valve assembly disposed in fluid communication with the lubricant charge chamber.

5. The lubrication system of claim 1 wherein the drive fluid valve member defines a detune channel and a valve member passage,
    the detune valve member being disposed within the detune channel and being movable relative to the drive fluid valve member,
    the detune valve member being configured to block flow through the valve member passage when disposed in the second detune position, and
    the detune valve member being configured to effect flow through the valve member passage when disposed in the first detune position.

6. The lubrication system of claim 1 further comprising at least one biasing member that biases the drive fluid valve member toward the first drive position.

7. The lubrication system of claim 1 further comprising at least one detune biasing member that biases the detune valve member toward the first detune position.

8. The lubrication system of claim 1 wherein the detune valve member is operable between the first detune position and the second detune position in response to lubricant pressure within the lubricant charge chamber and movement of the drive fluid valve member relative to the housing.

9. The lubrication system of claim 1 wherein the housing further defines at least one drive fluid inlet and at least one fluid bypass passage, the at least one drive fluid inlet and the at least one fluid bypass passage being fluidly coupleable to a drive fluid source.

10. The lubrication system of claim 9 wherein the housing further defines at least one drive fluid hammer passage that is fluidly coupleable to a work tool power cell.

11. A machine comprising a tool powered by a drive fluid, and a lubrication system for the tool, the lubrication system comprising:
a housing defining an internal bore therein, the internal bore at least partly defining a valve channel and a lubricant charge chamber having a variable volume,
a lubricant reservoir in fluid communication with the lubricant charge chamber via a lubricant inlet defined by the housing, the lubricant charge chamber being in fluid communication with the tool via a lubricant outlet defined by the housing,
a drive fluid valve member disposed within the valve channel and movable relative to the housing from a first drive position to a second drive position in response to a pressure of a drive fluid to reduce the variable volume of the lubricant charge chamber, the drive fluid valve member defining a detune channel, the drive fluid valve member being fluidly coupled to a drive fluid source via a drive fluid inlet defined by the housing, the drive fluid source being distinct from the lubricant reservoir,
a detune valve member disposed within the detune channel and movable relative to the drive fluid drive member between a first detune position and a second detune position in response to a lubricant pressure within the lubricant charge chamber,
the detune valve member being configured to
effect fluid communication between the drive fluid inlet and a drive fluid bypass outlet defined by the housing when the detune valve member is in the first detune position, and
block fluid communication between the drive fluid inlet and the drive fluid bypass outlet when the detune valve member is in the second detune position.

12. The machine of claim 11 further comprising a lubricant valve assembly disposed in fluid communication with the lubricant reservoir.

13. The machine of claim 12 wherein the drive fluid valve member includes at least one valve member passage, the detune valve member blocking flow through the at least one valve member passage when disposed in the second detune position, and the detune valve member effecting flow through the at least one valve member passage when disposed in the first detune position.

14. The machine of claim 13 further comprising at least one biasing member that biases the drive fluid valve member toward the first drive position.

15. The machine of claim 14 further comprising at least one detune biasing member that biases the detune valve member toward the first detune position.

16. The machine of claim 11 wherein the tool is a hydraulic powered hammer.

17. A method for lubricating and detuning a tool, the method including:
moving a drive fluid valve member from a first drive position to a second drive position in response to a pressure of a drive fluid associated with operation of the tool to reduce a volume of a lubricant charge chamber having a variable volume,
delivering a lubricant to the tool from the lubricant charge chamber when the drive fluid valve member moves from the first drive position to the second drive position,
moving a detune valve member between a first detune position and a second detune position in response to a pressure of the lubricant within the lubricant charge chamber,
delivering a drive fluid from a drive fluid source to a drive fluid inlet passage, the drive fluid being distinct from the lubricant,
effecting a fluid connection between the drive fluid inlet passage and a bypass fluid passage when the detune valve member is in the first detune position, and
blocking the fluid connection between the drive fluid inlet passage and the bypass fluid passage when the detune valve member is in the second detune position.

18. The method of claim 17 further comprising moving the detune valve member from the first detune position to the second detune position as the drive fluid valve member moves from the first drive position to the second drive position when the lubricant charge chamber includes sufficient lubricant to exert a pressure to overcome a biasing force toward the first detune position of the detune valve member.

19. The method of claim 18 further comprising maintaining the detune valve member in the first detune position as the drive fluid valve member moves from the first drive position to the second drive position when the lubricant charge chamber does not contain sufficient lubricant to exert a pressure to overcome the biasing force toward the first detune position of the detune valve member.

20. The method of claim 17 further comprising drawing the lubricant into the lubricant charge chamber by moving the drive fluid valve member from the second drive position to the first drive position in response to a biasing force.

* * * * *